(12) United States Patent
Sørensen

(10) Patent No.: US 10,798,172 B2
(45) Date of Patent: Oct. 6, 2020

(54) DATA PROCESSING SYSTEM AND METHOD TO USE THE DATA PROCESSING SYSTEM

(71) Applicant: Furuno Electric Co., Ltd., Nishinomiya (JP)

(72) Inventor: Mads Friis Sørensen, Hvidovre (DK)

( * ) Notice: Subject to any disclaimer, the term of this patent is extended or adjusted under 35 U.S.C. 154(b) by 239 days.

(21) Appl. No.: 15/554,820

(22) PCT Filed: Mar. 4, 2015

(86) PCT No.: PCT/IB2015/051588
§ 371 (c)(1),
(2) Date: Aug. 31, 2017

(87) PCT Pub. No.: WO2016/139506
PCT Pub. Date: Sep. 9, 2016

(65) Prior Publication Data
US 2018/0020056 A1    Jan. 18, 2018

(51) Int. Cl.
*H04L 29/08* (2006.01)
*G01C 21/20* (2006.01)
(Continued)

(52) U.S. Cl.
CPC ............ *H04L 67/12* (2013.01); *G01C 21/203* (2013.01); *G06F 8/65* (2013.01); *G06F 9/4451* (2013.01); *H04L 67/36* (2013.01); *H04L 67/42* (2013.01)

(58) Field of Classification Search
CPC ......... G01C 21/203; G01C 21/20; G06F 8/65; G06F 9/4451; G06F 16/972; H04L 67/12; H04L 67/36; H04L 67/42; H04L 41/28; H04L 67/02; H04L 67/10; B63B 49/00; B63H 21/22; H04W 4/38
See application file for complete search history.

(56) References Cited

U.S. PATENT DOCUMENTS 6,954,877 B2 * 10/2005 Earl ................... G06F 11/1446
714/11
6,978,396 B2 * 12/2005 Ruuth ................ G06F 11/1471
714/6.3

(Continued)

FOREIGN PATENT DOCUMENTS

EP         2199914 A1    6/2010
JP   WO2007129366 A1   11/2007

(Continued)

OTHER PUBLICATIONS

ISA Japan Patent Office, International Search Report Issued in PCT Application No. PCT/IB2015/051588, dated Jun. 9, 2015, WIPO, 1 page.

(Continued)

*Primary Examiner* — Christopher Biagini
(74) *Attorney, Agent, or Firm* — Alleman Hall Creasman & Tuttle LLP

(57) ABSTRACT

The present invention relates to a data processing system and a method to process maritime software application as well as software updates on a ship comprising a main hardware-sever and a subordinate hardware-server with multiple maritime applications wherein the subordinate server and the main sever may change their respective role and function.

9 Claims, 6 Drawing Sheets

(51) Int. Cl.
    *G06F 8/65*         (2018.01)
    *G06F 9/445*      (2018.01)
    *H04L 29/06*     (2006.01)

(56) References Cited

U.S. PATENT DOCUMENTS

| | | | |
|---|---|---|---|
| 2002/0026495 A1* | 2/2002 | Arteaga | G06F 9/5055 |
| | | | 709/217 |
| 2005/0091288 A1* | 4/2005 | Ji | G06F 11/1433 |
| 2008/0147257 A1* | 6/2008 | Kuhlgatz | B63B 49/00 |
| | | | 701/21 |
| 2008/0155023 A1* | 6/2008 | Kadashevich | G06F 11/1482 |
| | | | 709/206 |
| 2010/0017647 A1 | 1/2010 | Callaway et al. | |
| 2016/0191519 A1* | 6/2016 | Surendrakumar | H04L 63/10 |
| | | | 726/7 |

FOREIGN PATENT DOCUMENTS

| | | |
|---|---|---|
| JP | WO2013153977 A1 | 10/2013 |
| WO | 2006033882 A2 | 3/2006 |

OTHER PUBLICATIONS

European Patent Office, Extended European Search Report Issued in Application No. 15883855.7, dated Oct. 11, 2018, Germany, 7 pages.
Remote administration, Wikipedia Website, Available Online at https://en.wikipedia.org/w/index.php?title=Remote_administration&oldid=649610643, website accessed Nov. 29, 2019, 4 pages.
European Patent Office, Office Action Issued in Application No. 15883855.7, dated Dec. 6, 2019, Germany 5 pages.

\* cited by examiner

DATA PROCESSING SYSTEM AND METHOD TO USE THE DATA PROCESSING SYSTEM

The present invention relates to a data processing system and a method to perform a software update or installation of a maritime software application using the data processing system.

The present invention therefore relates to a data processing system and a method to process maritime software application as well as software updates on a ship comprising a main hardware-server containing multiple maritime software applications operated from at least one client-workstation with a user interface and a subordinate hardware-server containing multiple maritime software applications, wherein the subordinate hardware-server is configured to copy data processed by the multiple maritime software applications based on the outputs from multiple maritime sensors on the main hardware-server to the subordinate hardware-server.

Several technical terms used in the present invention should be understood for a skilled person under the following described technical interpretation. A server is a hardware-server and as such a running instance of one or more different software applications capable of accepting requests from a connected client and giving responses accordingly. The advantage of running a server on a ship is manifold, such as workability, reliability and security. For this reason most of the servers are daemon processes and designed by the designers in such a way that they can be ran on a specific computer. Servers usually operate within a client-server architecture.

Servers are also considered to be software servers, that mean software applications running to serve the requests of other programs, typically requested by the clients. Thus, the server performs some tasks on behalf of clients. The clients typically connect to the server through the network either by wire or by wireless connectivity. Servers which shall be installed on ship systems have different needs compared to data processing networks handling standard software applications. For example, an ECDIS application may be provided on a ship.

An Electronic Chart Display & Information System (ECDIS) is a computer-based chart navigation information system that complies with International Maritime Organization (IMO) regulations and which is used as an alternative to paper nautical charts and other manual devices. ECDIS provides continuous position and navigational safety information. The system generates audible and/or visual alarms when the vessel is in proximity to navigational hazards.

An ECDIS system displays the information from electronic navigational charts (ENC) or Digital Nautical Charts (DNC) and integrates position information from position, heading and speed through water reference systems and optionally other navigational sensors. Other sensors which could interface with an ECDIS are, e.g. radar systems, automatic identification systems (AIS), Sailing Directions and fathometer systems.

Therefore, there is a need to implement sensor systems, computer software, maritime applications and hardware components to an appropriate onboard data processing system.

Furthermore, more and more maritime applications are used on ships and vessels to manage respective tasks, such as RADAR, Conning, AMS, IAS, Cargo-applications etc. The commonly known systems works on a sole computer basis wherein no high redundancy is present. The safety and reliability of known installed systems should therefore be increased.

One aspect is the human and human interface in such a procedure. A human interface is a display or a screen showing several kinds of information from associated sensors and from outside via satellite communication devices etc. Furthermore the security and availability of operating systems are also very important.

Another aspect is how to provide an INS [Integrated Navigation System] to be implemented as an IBS [Integrated Bridge System] with the easy ability to include other systems provided as applications or Apps. Typically on offboard solutions software applications run on servers, which will be replaced in the future more and more by cloud servers. For the above purpose, it is desirable that satellite communication systems and other communication systems shall have sufficient bandwidth and capacity and shall be sufficiently reliable to be used for ships or vessels.

It is also preferable to share resources between workstations on a ship, like processing power and graphics processing power. It is furthermore desirable to improve the handling, the maintenance and the reliability of the update and upload procedure for the used onboard software application. Moreover, the service and maintenance should preferably not be performed on a workstations on the ship-bridge.

Therefore an object of the present invention is to overcome the above-mentioned problems and to provide an improved method and data processing system.

To overcome the above said problems a data processing system and a method to process maritime software application as well as software updates on a ship are provided comprising a main hardware-server containing multiple maritime software applications operated from at least one client-workstation with a user interface and a subordinate hardware-server containing multiple maritime software applications, wherein the subordinate hardware-server is configured to copy data processed by the multiple maritime software applications based on the outputs from multiple maritime sensors on the main hardware-server to the subordinate hardware-server. This configuration may be achieved by respective appropriate means to copy data from multiple maritime sensors on the main hardware-server to the subordinate hardware-server.

The basic concept of the present invention therefore grounds on a virtual bridge. The virtual bridge is a new and different approach to (i) conventional navigation equipment design, (ii) bridge management and operation, (iii) service and maintenance, (iv) disaster recovery and (v) remote access to live data. Where traditional ship systems are independent systems with own integrated hardware, software and user interfaces, the Virtual Bridge System is utilising ship systems with software applications, which can run a centralised servers on board of the ship and can be managed and operated by the users through client workstations, that are not necessarily dedicated to the ship systems. Consequently, this means that the workstations change tasks and functionality depending on the user by means of the software applications.

The virtual bridge system utilises software applications which are combined with cloud servers, virtual workstations, ship systems and sensors. The on board ship systems all have a related software application installed on the on board servers and the applications run on the servers. The virtual bridge system will have two or more server systems installed. The servers (two or more to achieve redundancy) are connected to sensors through multiple networks. These sensors may be navigation sensors, engine sensors, cargo sensors and much more. The server systems are mirrored to obtain full redundancy of both hardware and software.

The workstations are designated for the different purposes on board of a vessel, such as navigation, communication, automation, cargo control/monitoring, power management, etc. The workstations are working as simple clients in the network together with the on board servers. The workstations are not running the actual application, which controls the ship systems. The workstations simply work as virtual workstations providing a user interface to the crew member. Since all the different tasks are managed through software application and not through specific and dedicated hardware, all the workstations will be considered as identical hardware.

The ship owner, the ship management company or the technical operation office (hereafter called operation office) define, which software applications are available on each ship, thereby defining which functionalities are available on board of the respective vessel. The operation office can add and remove software application depending on the ships hardware configuration and needed tools and it can assign individual access to the different application for each crew member, depending on the crew members work assignment and responsibilities. Each crew member receives his own profile (hereafter called as "ID"), which means his own virtual machine user interface (image) with access to the software applications dedicated for his work, responsibilities and competences. This profile can be activated on any of the virtual workstations in the network on board the vessel. This specific ID can also be transferred together with the crew member to other vessels. The Operation Office can also create "IDs" for other stake holders like authorities, ships agent, the customer, ship manager, pilot etc. and allow them access to specific software applications relevant to them. They can use their own BYOD (Bring Your Own Device) for the purpose.

In a preferred embodiment of the invention the main hardware-sever is configured to limit the function for the maritime software applications on the client-workstation based on a user profile. This configuration may be achieved by respective appropriate technical means (a g. access approval apparatus or entrance qualification system) to limit the function for the maritime software applications on the client-workstation based on a user profile. The user profile may include at least one of the following items: whether a user is a ship owner, a manufacturer, or a crew, a training level of a crew, a specific certification level of a crew member and, e.g. a job classification of a crew.

In a further beneficial embodiment of the invention the subordinate hardware-server is further configured to copy the multiple maritime software applications from the main hardware-server. Preferably, the main hardware-server and the subordinate hardware-server are further configured to switch the main hardware-server into the subordinate hardware-server and the subordinate hardware-server into the main hardware-server respectively when the subordinate hardware-server completes updating its multiple maritime software applications.

According to an advantageous embodiment of the present invention the subordinate hardware-server completes updating its multiple maritime software applications once the subordinate hardware-server verifies all software applications.

The data processing system may be configured in such that a client-workstation located on land or in another ship operates the maritime software applications via a wireless communication.

One further aspect of the present invention is relating to the multiple maritime sensors. Such sensors are at least a GNSS antenna and a maritime radar antenna, and the multiple maritime software applications are at least of an Electronic Chart Display & Information System (ECDIS) and of a Marine Radar System. Preferably the main hardware-server is configured to assign the Electronic Chart Display & Information System as the maritime software application on at least one client-workstation and the Marine Radar System as the maritime software application on at least two of the remaining client-workstation.

Another aspect of the present invention is relating to a method of operating multiple maritime software applications on a ship comprising operating multiple maritime software applications contained a main hardware-server from at least one client-workstation with a user interface, copying data processed by the multiple maritime software applications based on the outputs from multiple maritime sensors on the main hardware-server to a subordinate hardware-server which contains multiple maritime software applications. Preferably, the method is performed in such that the multiple maritime copies software applications from the main hardware-server to the subordinate hardware-server.

It is furthermore beneficial to switch the main hardware-server into the subordinate hardware-server and the subordinate hardware-server into the main hardware-server respectively when the subordinate hardware-server completes updating its multiple maritime software applications.

By not dedicating hardware to the individual tasks and functionalities it is possible to easily add and remove software applications as long as the ship systems and sensors support them. This makes the system much more flexible because the operating office may add new software applications necessary for a specific voyage or operation in specific environments. The applications can be added and removed later, when they are no longer needed. Traditional ship systems are not easily allowing such flexibility because the software is embedded in the ship system and not on a server system. It will normally require the involvement of a service engineer from the manufacturer of the ship system.

For example, the ship is going to operate in the Arctic region for several months and the ship owner would like to add ice radar functionality to the radar system and ice chart service to the electronic chart and information system (ECDIS) during this period of time. The Operation Office purchase or rent the software application from the radar and ECDIS suppliers and have them uploaded to the ship server systems. Then the Operation Office verifies the performance by login into the ship server systems using a workstation in their office. Finally the Operation Office applies the software application to all the navigation officers' user interface IDs and they can operate it immediately.

Because the technology allows for connecting remote workstations to the Virtual Bridge System environment, it is also possible to control the vessel from shore side similar to a drone. Due to the location of the server systems on board the vessel, all data and performance are directly using the on board sensor data and status data from the ship systems allowing the remote operator(s) to control the vessel while underway.

By utilising the virtual machine environment with remote access using BYOD (Bring Your Own Device), it is making it possible for any interested party to access relevant data controlled and managed by the Operation Office for their specific purposes. For example a customer having foods items freighted in refrigerated containers would like to monitor the temperature of the containers. He gets access to the system using his BYOD and a user interface ID generated and provided by the Operation Office. When the shipment is finished, the ID is erased and the customer cannot access the vessel data again.

As already mentioned above, the system and the method may be configured in the manner that one or more client-workstation are equipped, e.g. with an access limitation system which is configured to set restrictions to execute installed software application either to specific extent and/or for specific user or crew member. The same may apply to workstations in a shore side office. Thus, one or more shore side client-workstation may be configured to be limited to:
- monitor the data from the main hardware-server and/or
- to update the maritime software applications and/or
- to upload a new/revised maritime data and/or
- to configure the servers and/or
- to remotely control a maritime sensor of the multiple maritime sensor via the main hardware-server.

DESCRIPTION OF THE DRAWINGS OF THE EXEMPLARY EMBODIMENTS

A more complete appreciation of the invention and many of the attendant advantages thereof will be readily obtained as the same becomes better understood by reference to the following detailed description when considered in connection with the accompanying drawings, wherein.

Figure 1:
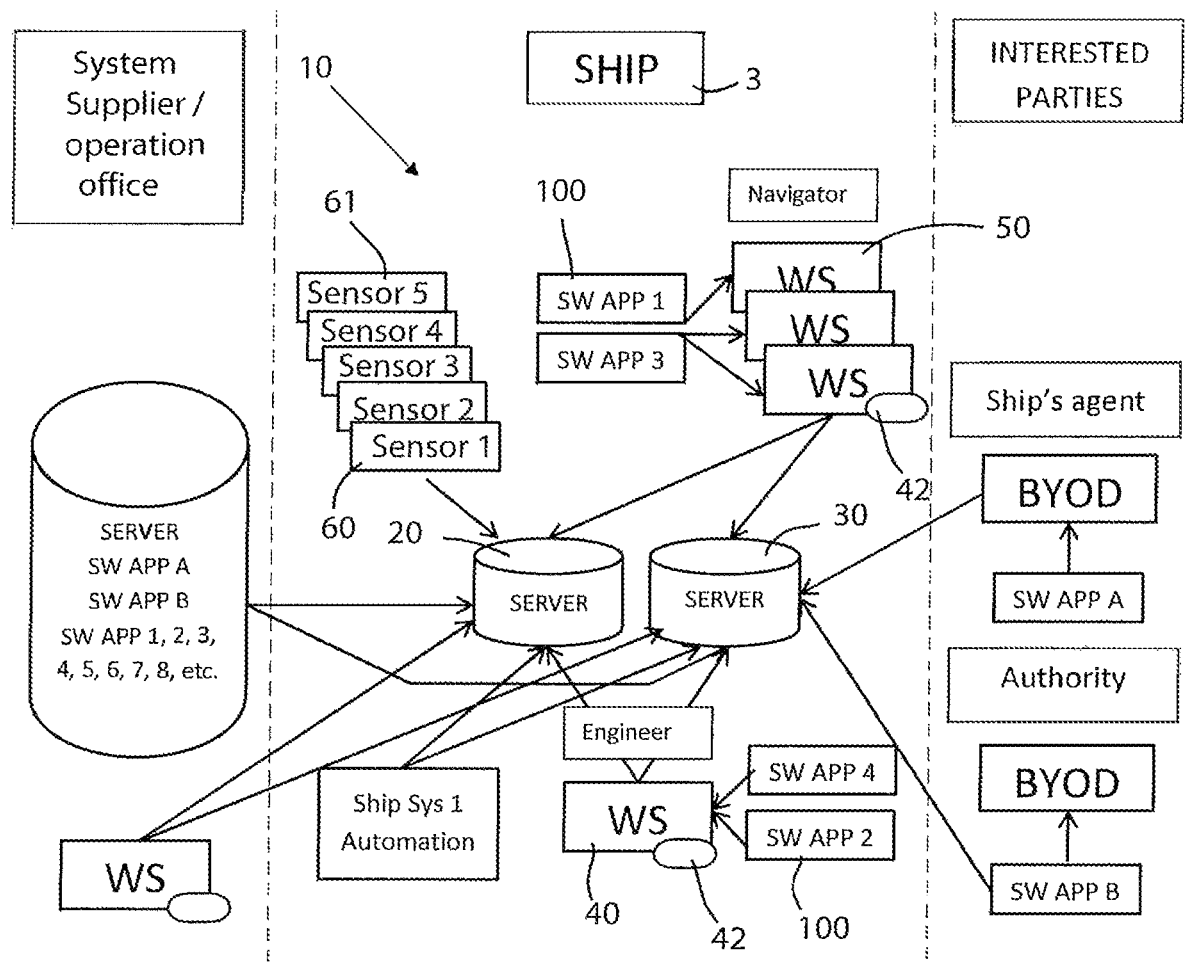
FIG. 1 is a schematic view of an exemplary embodiment of the virtual bridge system of the present invention.

FIG. 1 show a schematic view of an exemplary embodiment of a virtual bridge system according to the present invention, showing a system supplier configuration together with a configuration of a ship 3 and a configuration of interested parties, such as the ship's agent, authorities or a ship owner. The virtual bridge configuration is based on a data processing system 10 to operate multiple maritime software applications 100 on a ship 3 comprising a main hardware-sever 20 containing multiple maritime software applications 100 operated from at least one client-workstation 40 or 50 with a user interface 42 and a subordinate hardware-server 30 containing multiple maritime software applications 100, wherein the subordinate hardware-server 30 is configured to copy data processed by the multiple maritime software applications 100 based on the outputs from multiple maritime sensors 60 on the main hardware-server to the subordinate hardware-server.

The virtual bridge system utilises software applications 100 combined with cloud servers 20, 30 virtual workstations 40, 50 ship systems and sensors 60, 61. The on board ship systems all have a related software application installed on the on board servers 20, 30 and the applications 100 run on the servers. The virtual bridge system will have two or more server systems 20, 30 installed. The servers 20, 30 are connected to sensors 60, 61 through multiple networks. These sensors can be navigation sensors, engine sensors, cargo sensors and much more. The server systems are mirrored to obtain full redundancy of both hardware and software.

Furthermore, the data processing system 10 comprises a subordinate hardware-server 30 with at least the identical multiple maritime applications 100 of the main hardware server 20. The subordinate hardware-server 30 is configured to continuously copies/receives and/or shares data with the main hardware-server 20 which are received from a multiple maritime sensor 60. The multiple maritime sensor 60 may be one or more physical sensors 61 or apparatus, such as GPS (Global positioning System), Gyro, Radar, Sonar, Anemometers, IAS, etc. Each of both server 20, 30 includes maritime applications or Apps, such as a radar application, ECDIS, Conning, AMS-application, IAS-application and/or cargo-control-applications, etc.

The data processing system 10 according to this embodiment comprises several client-workstation 40 and all of them may be substantially identical, comprising a display 41 and a user interface 42 to execute applications 100 by a user on each of the workstation 40. As mentioned above, each user may have a specific ID, which may restrict the execution to some specific applications 100. The data processing system 10 may comprises several client-workstation 50 on land or another vessel, also configures with substantially the same hardware configuration, comprising a display 51 and a user interface 52 to either execute applications 100 or to monitor executed applications by a user, dependent on the access rights.

The main hardware-sever 20 may therefore be configured to limit the function for the maritime software applications 100 on the client-workstation 40, 50 based on a user profile.

The subordinate hardware-server 30 is therefore configured to copy the multiple maritime software applications 100 from the main hardware-server 20. The main hardware-server 20 and the subordinate hardware-server 30 are further configured to switch the main hardware-server into the subordinate hardware-server and the subordinate hardware-server into the main hardware-server respectively when the subordinate hardware-server completes updating its multiple maritime software applications 100. The subordinate hardware-server 30 is configured to conditionally replace the main multiple hardware-server 20 under certain conditions. Should the main server, e.g. drop off, the subordinate hardware-server 30 takes immediately over the role of the main server and the main server 20 will be considered as a subordinate hardware-server. The subordinate hardware-server 30 completes updating its multiple maritime software applications 100 once the subordinate hardware-server 30 verifies all software applications 100.

Figure 2:
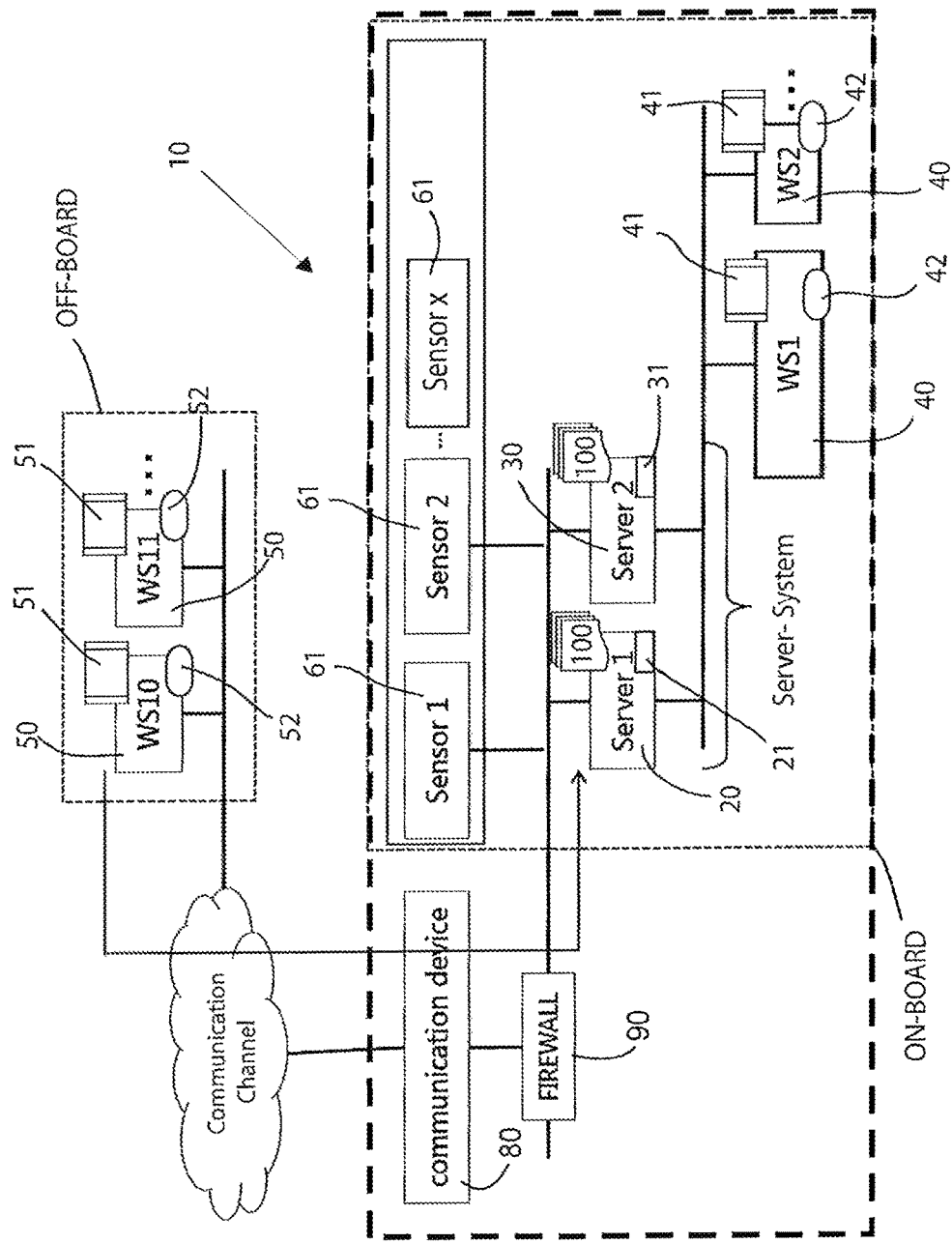
FIG. 2 is a schematic view of an exemplary embodiment of the present invention.

A similar embodiment is shown in FIG. 2, which is another schematic view of an exemplary embodiment of data processing system 10 of the present invention. FIG. 2 is designated to explain the Bridge Management Systems and the parts thereof. The data processing system 10 is established to process maritime software applications on a ship. The data processing system 10 comprises a main multiple hardware-server 20 including a software-server 21 with multiple maritime software applications 100 executable from client-workstations 40, 50. Under normal use this server 20 processes the software applications 100, which may, e.g. be displayed for a crew member on their respective screen 42 on one of the workstations 40, 50. A virtual workstation may also be a handheld or a mobile device, which is capable to be implemented in the host and to function as a client-workstation in the data processing system 10.

The ship owner or an operation office define which software applications 100 are available on each ship 3, thereby defining which functionalities are available on board the ship 3. The operation office can add and remove software application 100 depending on the ships hardware configuration and needed tools and it can assign individual access to the different application 100 for each crew member, depending on the crew members work assignment and responsibilities. Each crew member receives his own "ID", which means his own virtual machine user interface 42 with access to the software applications 100 dedicated for his work, responsibilities and competences. This ID can be activated on any of the virtual workstations 40, 50 in the network on board the ship 3. The ID can also be transferred together with the crew member to other vessels. The Operation Office can also create "IDs" for other stake holders like authorities, ships agent, the customer, ship manager, pilot etc. and allow them access to specific software applications 100 relevant to them.

Another aspect of the present invention is the disaster recovery. All the IDs together with the software applications 100 are stored on the servers 20, 30 on board the ship 3 and on servers at the Operation Office. In case of a total breakdown, disaster recovery is accomplished by replacing any defective or damaged hardware and uploading all the relevant software applications 100 and IDs to the on board servers 20, 30 from the servers in the Operation Office. This can be performed remotely or on-site.

For example a fire in the super structure of the vessel has damaged all servers and all workstations of the vessel. The equipment supplier installs new identical servers and virtual workstations. The operation office or the equipment supplier/service provider assigned by the operation office can upload the relevant software applications 100 and crew member user interface 42 IDs on-site or by remote access from the servers at the operation office or the equipment supplier.

Figure 3:
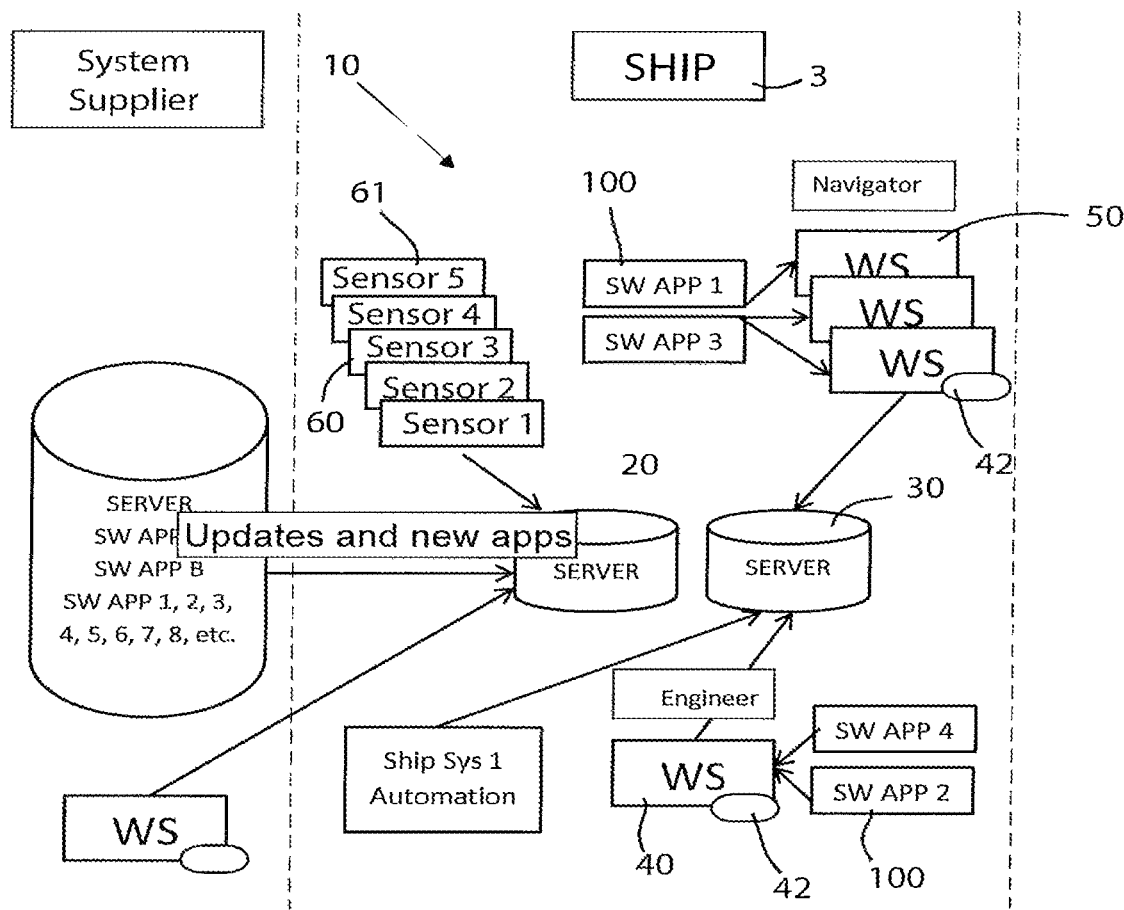
FIG. 3 shows a step 1 wherein, software patches, updates and new applications are uploaded.
Figure 4:
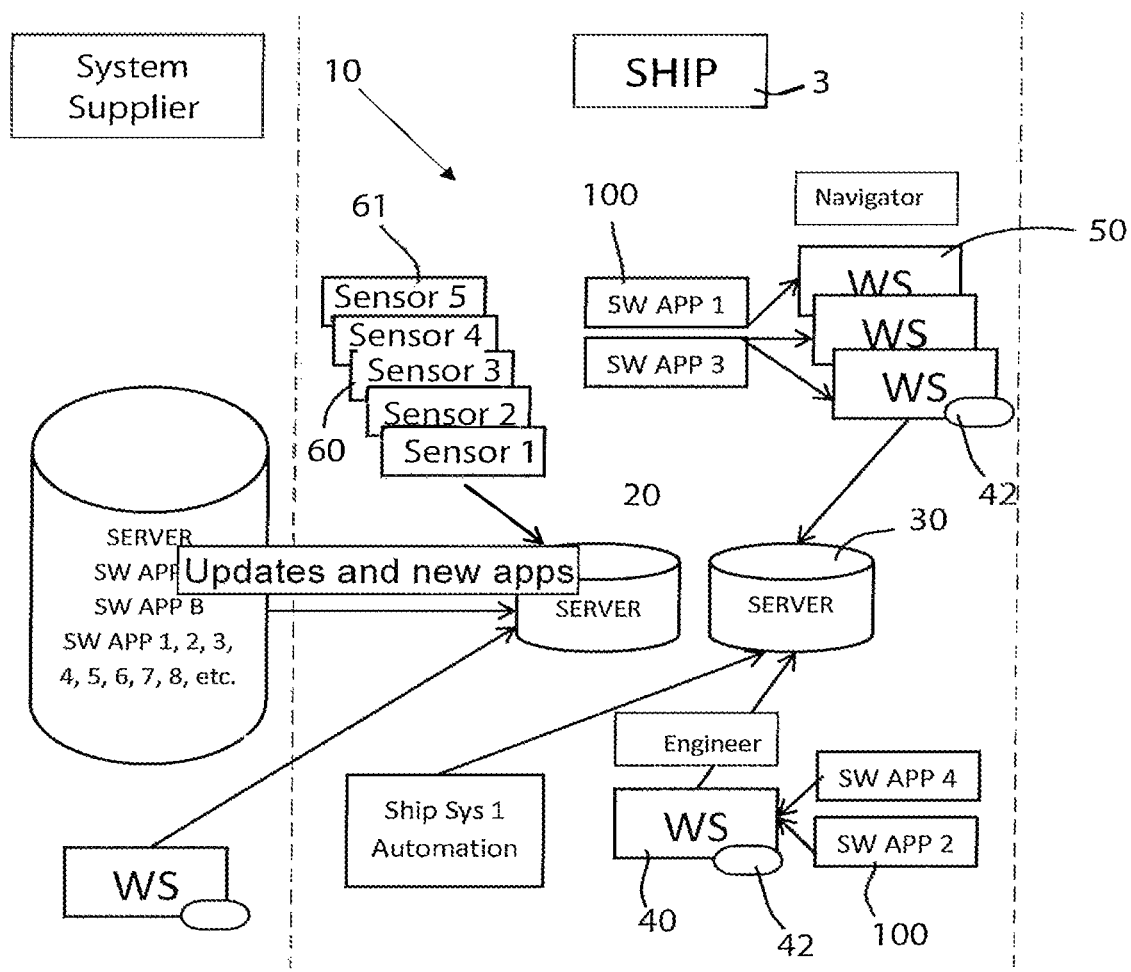
FIG. 4 shows a step 2, wherein the system supplier logs in to the system using on shore workstation and verifies the performance of the existing and uploaded new software applications.
Figure 5:
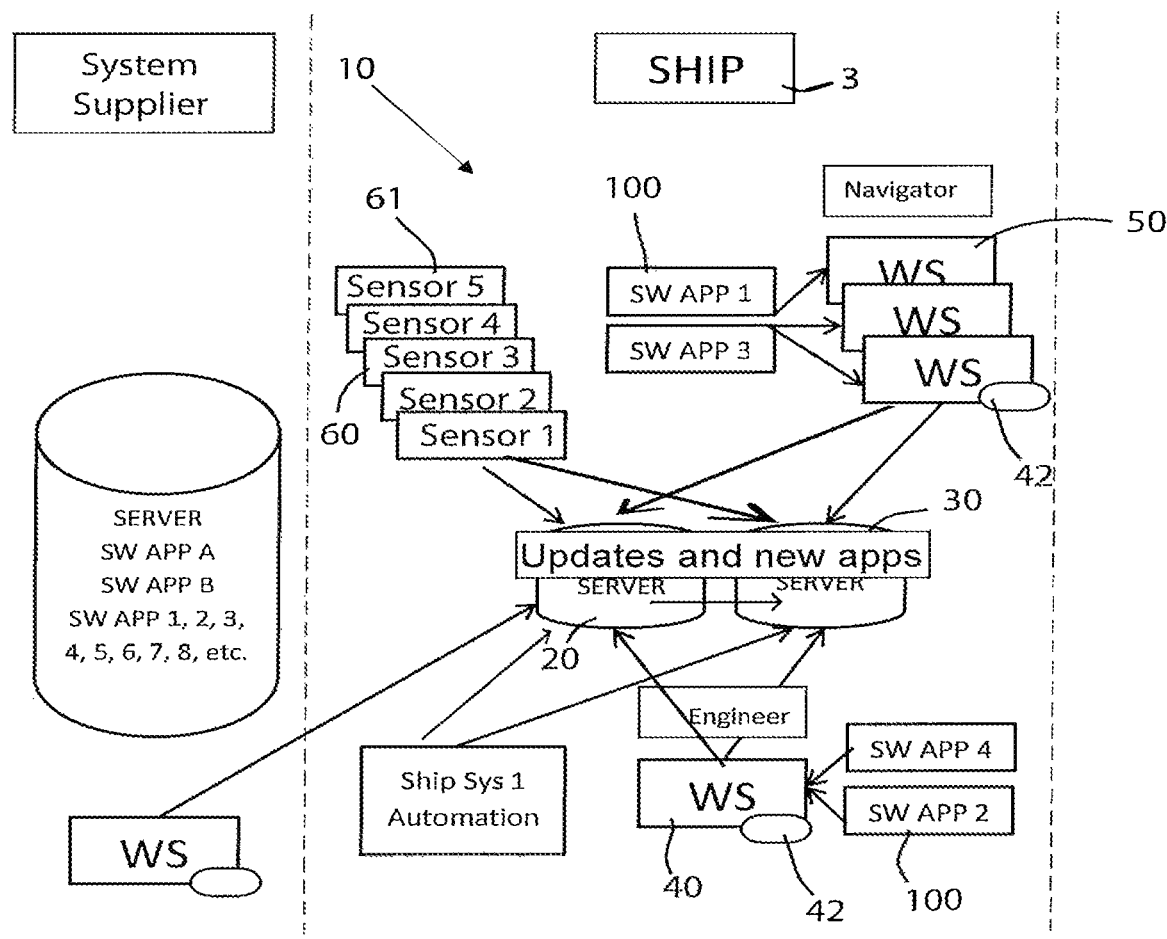
FIG. 5 shows a step 3, wherein the software is mirrored and normal operation re-established.

Moreover, in FIGS. 3 to 5 method steps of the method to perform a software update or installation of a maritime software application 100 using the data processing system 10 according to FIG. 1 and FIG. 2 are shown.

The following main steps are displayed in FIGS. 3 to 5:

Step 1: Software patches, updates and new applications are uploaded (see FIG. 3). In step 2 the system supplier logs in to the system using on shore workstation and verifies the performance of the existing and new software applications (see FIG. 4) and step 3, wherein the software is mirrored and normal operation re-established (see FIG. 5).

Figure 6:
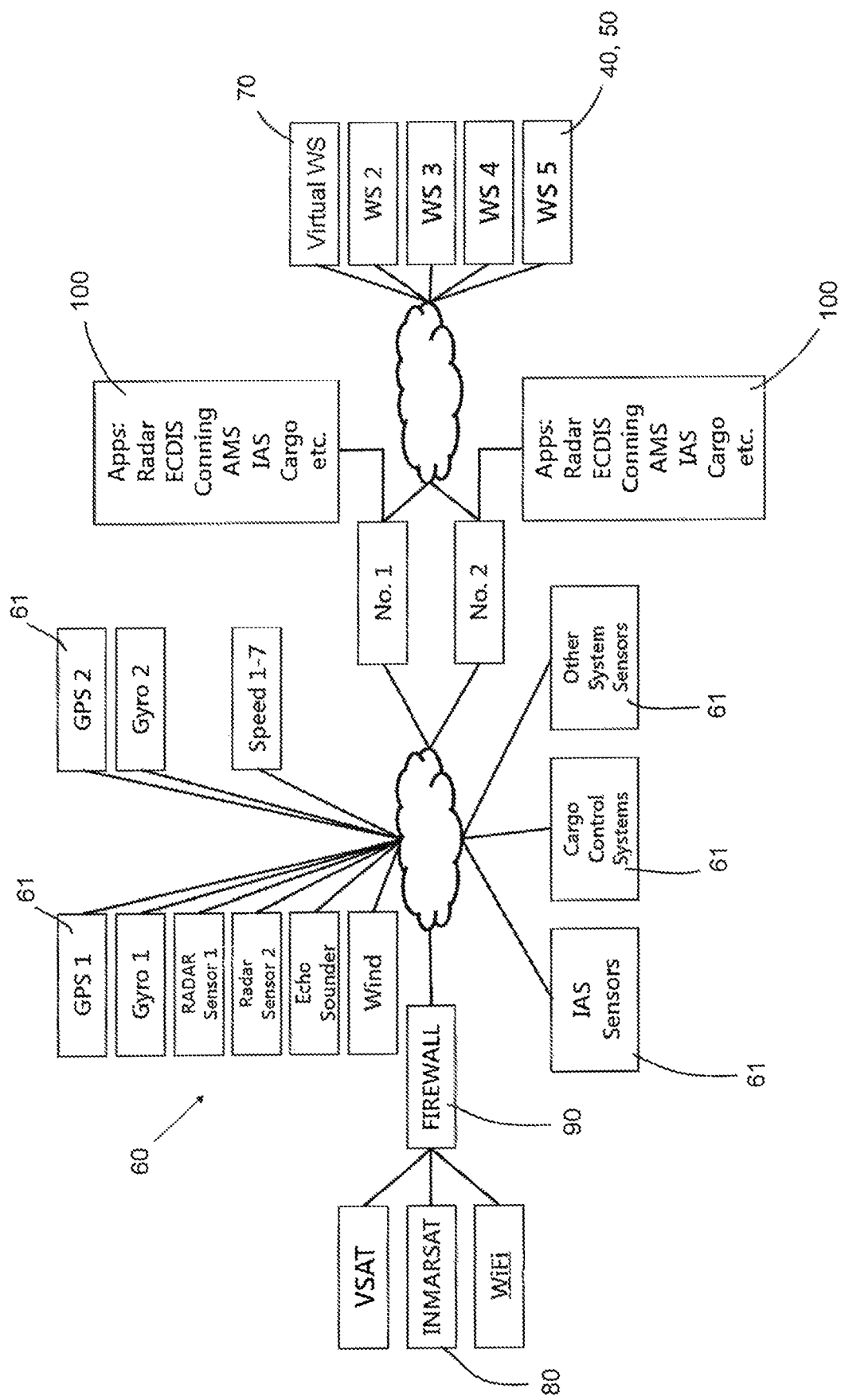
FIG. 6 is a schematic view of an architectural configuration of the hardware and software components of the embodiments shown in FIGS. 1 and 2.

In FIG. 6 a schematic view of an architectural configuration of the hardware and software components of the embodiments shown in FIGS. 1 and 2 is demonstrated. The client-workstations 40, 50, the hardware-servers 20, 30 with the applications and the multiple maritime sensor 60 are connected via cloud connectivity to build a host, wherein the off-board client-workstations 50 are connected via wireless and satellite communication devices 80 and a firewall system 90 with the installed part on a vessel 3 of the data processing system 10. The system is not limited to the ship-bridge and respective workstations, but can be used all through the vessel for any purpose, if necessary.

While particular embodiments have been chosen to illustrate the invention, it will be understood by those skilled in the art that various changes and modifications can be made therein without departing from the scope of the invention as defined in the appended claims.

The invention claimed is:

1. A data processing system to process multiple maritime navigational software applications on a ship, the data processing system comprising:
   a main hardware-server containing the multiple maritime navigational software applications operable from at least one client-workstation with a user interface, wherein the main hardware-server is configured to limit a function of the maritime navigational software applications on the client-workstation based on a user profile that includes whether a user is a ship owner, a manufacturer, or a crew member, or includes a job classification of the user; and
   a subordinate hardware-server containing the multiple maritime navigational software applications, the subordinate hardware-server being configured to copy data processed by the multiple maritime navigational software applications on the main hardware-server based on outputs from multiple maritime navigational sensors from the main hardware-server to the subordinate hardware-server, wherein
   the main hardware-server and the subordinate hardware-server are further configured to switch the main hardware-server into the subordinate hardware-server and switch the subordinate hardware-server into the main hardware-server, when the subordinate hardware-server completes an update of its multiple maritime navigational software applications, the update relating to navigational charts and/or navigational functionality;
   the multiple maritime navigational sensors are connected to the main hardware-server via a first link, and connected to the subordinate hardware-server via a second link different from the first link;
   the main hardware-server acquires the outputs from the multiple maritime navigational sensors through one of the first and second links;
   the data processing system is configured as an Electronic Chart Display & Information System (ECDIS); and
   the first link and the second link are data connections within the ECDIS.

2. The data processing system of claim 1, wherein the subordinate hardware-server is configured to copy the multiple maritime navigational software applications from the main hardware-server.

3. The data processing system of claim 1, wherein the subordinate hardware-server completes the update of its multiple maritime navigational software applications once the subordinate hardware-server verifies all the multiple maritime navigational software applications.

4. The data processing system of claim 1, wherein the client-workstation located on land or in another ship operates the multiple maritime navigational software applications via a wireless communication.

5. The data processing system of claim 1, wherein the multiple maritime navigational sensors are at least a GNSS antenna and a maritime radar antenna, and the multiple maritime navigational software applications are at least applications of the ECDIS and a Marine Radar System.

6. The data processing system of claim 5, wherein the main hardware-server is configured to assign the applications of the ECDIS as the maritime navigational software application on at least one client-workstation and the Marine Radar System as the maritime navigational software application on at least two of the remaining client-workstation.

7. A method of operating multiple maritime navigational software applications on a ship, the method comprising:
  operating the multiple maritime navigational software applications contained in a main hardware-server from at least one client-workstation with a user interface, wherein the main hardware-server is configured to limit a function of the maritime navigational software applications on the client-workstation based on a user profile that includes whether a user is a ship owner, a manufacturer, or a crew member, or includes a job classification of the user,
  copying data processed by the multiple maritime navigational software applications based on outputs from multiple maritime navigational sensors from the main hardware-server to a subordinate hardware-server which contains the multiple maritime navigational software applications, and
  switching the main hardware-server into the subordinate hardware-server and switching the subordinate hardware-server into the main hardware-server, when the subordinate hardware-server completes an update of its multiple maritime navigational software applications, the update relating to navigational charts and/or navigational functionality, wherein
  the multiple maritime navigational sensors are connected to the main hardware-server via a first link, and connected to the subordinate hardware-server via a second link different from the first link;
  the main hardware-server acquires the outputs from the multiple maritime navigational sensors through one of the first and second links;
  the main hardware-server, the subordinate hardware-server, and the multiple maritime navigational sensors are configured as an Electronic Chart Display & Information System (ECDIS); and
  the first link and the second link are data connections within the ECDIS.

8. The method of claim 7, further including
  copying the multiple maritime navigational software applications from the main hardware-server to the subordinate hardware-server.

9. The method of claim 7, further including
  operating the multiple maritime navigational software applications by the client-workstation located on a land or in another ship via a wireless communication.

* * * * *